US010704982B2

(12) United States Patent
Cole

(10) Patent No.: US 10,704,982 B2
(45) Date of Patent: *Jul. 7, 2020

(54) SENSOR RECORDING ANALYSIS APPARATUS AND METHOD

(71) Applicant: ITRON, INC., Liberty Lake, WA (US)

(72) Inventor: Philip Alan Cole, Stow, MA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,725

(22) Filed: May 29, 2019

(65) Prior Publication Data
US 2019/0277722 A1 Sep. 12, 2019

Related U.S. Application Data

(63) Continuation of application No. 15/589,497, filed on May 8, 2017, now Pat. No. 10,359,335.

(60) Provisional application No. 62/466,843, filed on Mar. 3, 2017.

(51) Int. Cl.
G01M 3/24 (2006.01)
G01M 3/28 (2006.01)
G01M 3/00 (2006.01)

(52) U.S. Cl.
CPC ............ G01M 3/243 (2013.01); G01M 3/002 (2013.01); G01M 3/2815 (2013.01); Y04S 20/36 (2013.01)

(58) Field of Classification Search
CPC .... G01M 3/243; G01M 3/002; G01M 3/2815; Y04S 20/36
See application file for complete search history.

(56) References Cited

U.S. PATENT DOCUMENTS

| 5,038,614 | A | 8/1991 | Bseisu et al. |
|---|---|---|---|
| 5,974,862 | A | 11/1999 | Lander et al. |
| 6,453,247 | B1 | 9/2002 | Hunaidi |
| 6,567,006 | B1 | 5/2003 | Lander et al. |
| 6,957,157 | B2 | 10/2005 | Lander |
| 7,705,721 | B1 | 4/2010 | Chen et al. |
| 8,643,716 | B1 | 2/2014 | Kalokitis et al. |

(Continued)

FOREIGN PATENT DOCUMENTS

| FR | 2910619 A1 | 6/2008 |
|---|---|---|
| WO | 2017106490 A1 | 6/2017 |

OTHER PUBLICATIONS

Non-Final Office Action dated Sep. 28, 2018, for U.S. Appl. No. 15/589,497, 14 pages.

(Continued)

Primary Examiner — Toan M Le

(57) ABSTRACT

Methods and apparatus to analyze sensor recordings are disclosed. An example apparatus includes a sensor to record a plurality of recordings and a memory. The example apparatus also includes a processor to convert one or more of the plurality of recordings to corresponding spectral representations where the at least two recordings are separated by a time gap, calculate a spectral average based, at least in part, on the spectral representations, store the spectral average to the memory, and generate a data packet based, at least in part, on the spectral average. The example apparatus also includes a transceiver to transmit the data packet to another device to compare the spectral average to a baseline spectral average to determine a system condition.

29 Claims, 9 Drawing Sheets

(56) References Cited

U.S. PATENT DOCUMENTS

| | | | |
|---|---|---|---|
| 10,359,335 B2 * | 7/2019 | Cole | G01M 3/243 |
| 2006/0036404 A1 | 2/2006 | Wiklund et al. | |
| 2010/0106434 A1 | 4/2010 | Killion et al. | |
| 2011/0093220 A1 | 4/2011 | Yang et al. | |
| 2011/0301882 A1 | 12/2011 | Andersen | |
| 2013/0036796 A1 | 2/2013 | Fleury, Jr. et al. | |
| 2013/0101127 A1 | 4/2013 | Buchmann | |
| 2015/0052979 A1 | 2/2015 | Cho et al. | |
| 2015/0330863 A1 | 11/2015 | Dotan et al. | |
| 2018/0094775 A1 | 4/2018 | Jacobson et al. | |
| 2018/0172546 A1 | 6/2018 | Calzavara et al. | |

OTHER PUBLICATIONS

Notice of Allowance dated Mar. 1, 2019, for U.S. Appl. No. 15/589,497, 9 pages.

PCT International Search Report and Written Opinion dated Jun. 1, 2018, for PCT International Application No. PCT/US2018/020439, 14 pages.

Non-Final Office Action dated Oct. 1, 2019, for U.S. Appl. No. 15/819,677, 13 pages.

Notice of Allowance dated Oct. 2, 2019, for U.S. Appl. No. 15/808,539, 6 pages.

Bachner, "Piping for New Construction-Plastic vs. Copper," Oct. 30, 2015, retrieved online [http://healthybuildingscience.com/2015/10/30/new-construction-piping-plastic-vs-copper/] on Jun. 22, 2018, 17 pages.

Connell et al., "PEX and PP Water Pipes: Assimilable Carbon, Chemicals, and Odors," abstract, American Water Works Association Journal, issued Apr. 2016, vol. 108, No. 4, 1 page.

Lechevallier, "Conditions favouring coliform and HPC bacterial growth in drinking-water and on water contact surfaces," 2003 World Health Organization (WHO), Heterotrophic Plate Counts and Drinking-water Safety, IWA Publishing, London, UK, copyright 2003, pp. 178-197, 21 pages.

Lee, "An Evaluation of Microbial and Chemical Contamination Sources Related to the Deterioration of Tap Water Quality in the Household Water Supply System," International Journal of Environmental Research and Public Health, Sep. 2013, 10(9): 4143-4160, retrieved at [https://www.ncbi.nlm.nih.gov/pmc/articles/PMC3799508], published online Sep. 6, 2013, 19 pages.

Non-Final Office Action dated Jun. 26, 2019, for U.S. Appl. No. 15/808,539, 9 pages.

PCT International Search Report and Written Opinion dated Feb. 19, 2019, for PCT International Application No. PCT/US2018/059959, 14 pages.

Final Office Action dated Apr. 16, 2020, for U.S. Appl. No. 15/819,677, 18 pages.

* cited by examiner

SENSOR RECORDING ANALYSIS APPARATUS AND METHOD

RELATED APPLICATIONS

This application is a continuation of U.S. patent application Ser. No. 15/589,497, titled "METHODS AND APPARATUS TO ANALYZE RECORDINGS IN LEAK DETECTION," filed May 8, 2017, now U.S. Pat. No. 10,359,335, which claims benefit under 35 U.S.C. § 119(e) to U.S. Provisional Application No. 62/466,843 titled "METHODS AND APPARATUS TO ANALYZE RECORDINGS IN LEAK DETECTION," filed Mar. 3, 2017, both of which are incorporated herein by reference in their entireties.

FIELD OF THE DISCLOSURE

This disclosure relates generally to leak detection and, more particularly, to methods and apparatus to analyze recordings in leak detection.

BACKGROUND

Some known leak detectors employ acoustic sensors to detect noise and/or characteristic sounds, which may be indicative of a potential leak. In particular, these leak detectors are usually coupled to a pipe and/or portion of a fluid delivery system and typically utilize amplitude and/or a time-history of acoustic signals to determine a presence of a potential leak. However, many known leak detectors do not analyze and/or characterize waveforms in such an analysis.

In particular, the known leak detectors do not taken into account ambient/environmental noise, which can mask and/or provide false indications of a leak. Further, many known leak detection systems and/or sensors cannot distinguish characteristic noise that may be inherent in a particular system from leak noise(s). As a result, these leak detectors may be inaccurate and/or inherently lack capabilities of characterizing a condition of a respective fluid delivery system.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
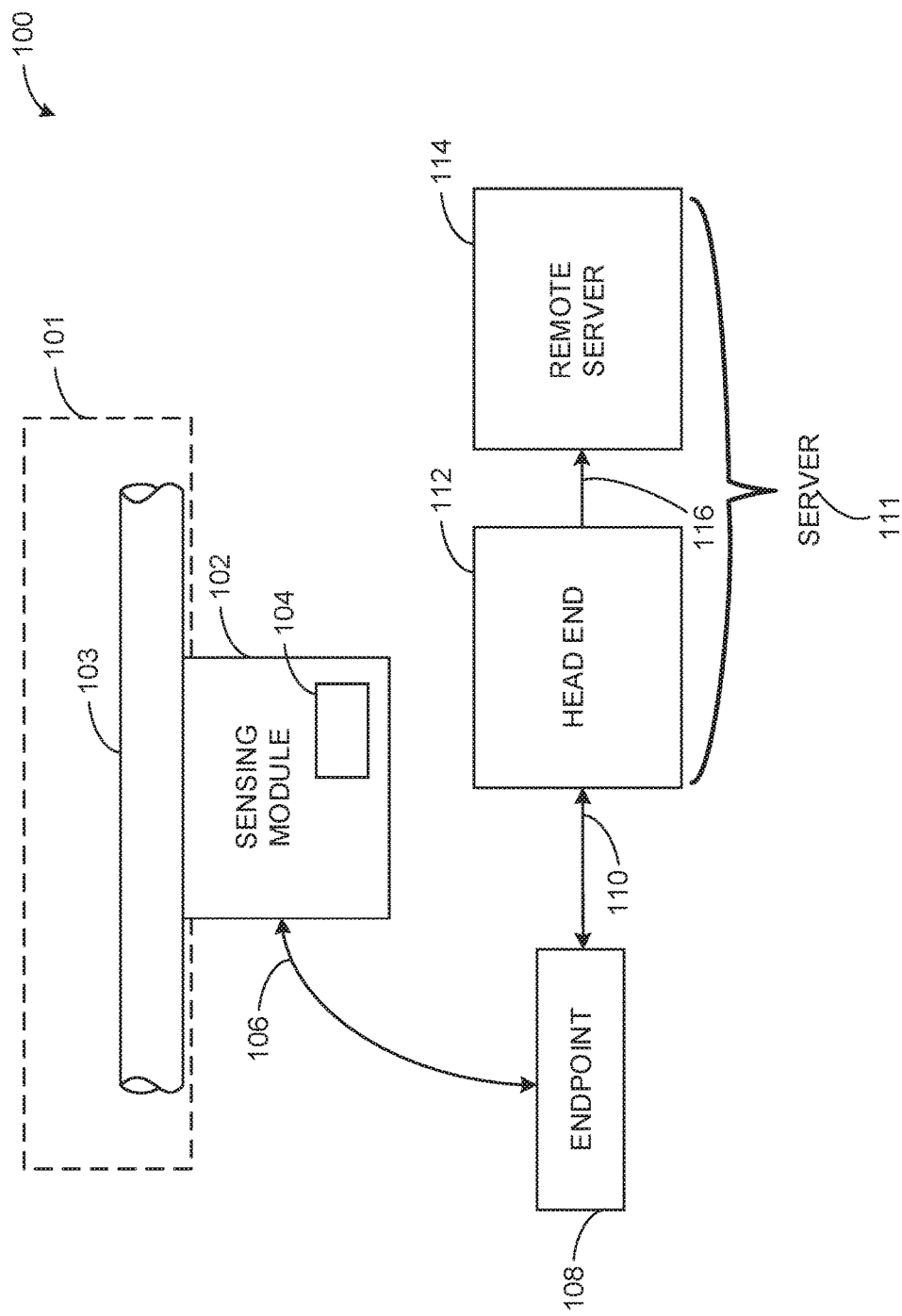
FIG. 1 is a schematic overview of an example utility measuring system in which the examples disclosed herein may be implemented.

Methods and apparatus to analyze recordings in leak detection are disclosed. Known leak detectors and/or systems often use sound amplitude to determine a presence of a leak in a fluid delivery system. However, many of these known systems cannot distinguish characteristic acoustic measurements and/or noise inherent in a particular system, thereby rendering potential inaccuracies in such systems. Further, known systems may be susceptible to false alarms and/or undetected leaks resulting from environmental and/or background noise.

The examples disclosed herein enable very accurate determination of leak conditions by removing uncertainty typically present in leak detection systems. The examples disclosed herein provide an effective and accurate manner of determining leak conditions and/or a presence of a leak in fluid utility measuring systems by characterizing inherent properties of such systems, which may pertain to environment, implementation and/or typical use. In particular, the examples disclosed herein utilize learning to generate spectral averages (e.g., baseline noise profiles, baseline spectral averages) that are unique to each particular system. Accordingly, these baseline measurements are collected over time (e.g., a few hours, a few weeks, a months, etc.) to fully characterize unique acoustic recordings/signatures inherent for a corresponding system. As a result, the examples disclosed herein account for random, environmental, usage and/or event-related noise.

The examples disclosed herein utilize a leak detection sensor, which may be utilized as an acoustic sensor or a pressure sensor, to record or measure multiple recordings (e.g., recording signatures) that are converted to spectral representations and, in turn, the spectral representations are used to generate spectral averages.

According to the examples disclosed herein, the leak detection sensor is to record or measure recordings that are converted spectral representations to generate a spectral average of the recordings. In particular, a current spectral average (e.g., a recent spectral average, today's spectral average, etc.) may be generated, for example. In turn, the current spectral average may be packaged or encoded into a data packet that is transmitted to be compared to a baseline spectral average to determine a leak condition. In some examples, this comparison occurs at a remote server. In other examples, this comparison occurs at the leak detection sensor itself.

In some examples, recordings may be recorded during a defined or known time period (e.g., within a certain time of installation) to define the aforementioned baseline spectral average such that baseline characteristics of an individual system (e.g., a node of a utility system, a utility system, a utility measuring system) are determined. In particular, the plurality of baseline recordings may be averaged by canceling and/or reducing noise present in the plurality of baseline recordings. These determined baseline characteristics are factored into leak determination(s), thereby greatly increasing accuracy thereof.

In some examples, the current spectral average is compared to a known signature (e.g., a known leak signature), which may be downloaded and/or received via a network. In such examples, determination of the leak condition may be at least partially based on this comparison between the known signature and the current spectral average. For example, the signatures and/or a database of the signatures may be stored in non-volatile memory corresponding to the leak detection sensor. In particular, the database may be referenced when analyzing/comparing the current spectral average.

In some examples, adaptive sampling/recording is performed by the leak detection sensor to vary a data acquisition mode of the leak detection sensor. In particular, a polling rate, a power use mode and/or power provided (e.g., an amount of power) to the leak detection sensor may be varied based on parameters related to a current recording and/or a difference between the current spectral average and the baseline spectral average. For example, an amplitude and/or a significant shift from the baseline spectral average may trigger a change in a power mode of the leak detection sensor.

Additionally or alternatively, a polling rate (e.g., a scan rate) of the leak detection sensor may be varied based on the current recording (e.g., the current recording exceeds a threshold amplitude) and/or the current spectral average. Additionally or alternatively, operation and/or parameters (e.g., power use mode(s), polling rates, etc.) of the leak detection sensor may be varied based on a time of day (e.g., the leak detection sensor is triggered from 1 am to 4 am based on lack of external noises during that time, etc.). In some examples, the leak detection sensor transmits a determined time of day to an external device (e.g., the leak detection sensor transmits the determined time of day to an endpoint so that the endpoint may "wake" the leak detection sensor).

Additionally or alternatively, the data acquisition mode and/or recording parameters may change within a session as a pattern is detected (e.g., a step change from past historical recordings) within the session to the current recording. Additionally or alternatively, factors such as pipe diameter, material, fluid pipe content, whether the pipe is carrying fluid or gas, and/or temperature (e.g., environmental temperature, pipe temperature, fluid temperature, etc.) varies an operating mode of the leak detection sensor (e.g., polling rate, sampling rate, signal filtering, recording method, etc.).

As used herein, the term "recording" refers to a measured or recorded signal or time-history that corresponds to a time period (e.g., a pre-defined time span). Accordingly, the term "recording" may be stored temporarily (e.g., in random access memory) or in a tangible medium, and may be represented or characterized over a frequency domain, for example. As used herein, the term "spectral average" refers to an averaged signal waveform.

As used herein, the terms "current recording" and "current spectral average" refer to a signal, plurality of signals and/or averaged signals defined or computed subsequent to a baseline characterization period. As used herein, the terms "baseline recording" or "baseline spectral average" refer to a signal, plurality of signals and/or averaged signals defined or computed during a known time period and/or during a learning time period (e.g., a time period around an installation time period).

FIG. 1 is a schematic overview of an example utility measuring system 100 in which the examples disclosed herein may be implemented. According to the illustrated example of FIG. 1, the utility measuring system 100 is to characterize and/or monitor a condition of a utility delivery system (e.g., a utility fluid delivery system, a utility delivery node, etc.) 101. The example utility measuring system 100 includes a sensing module 102 that is coupled to a pipe 103 (of the utility delivery system 101) and includes an analysis module 104, and a first bi-directional communication link 106 that communicatively couples the sensing module 102 to an endpoint (e.g., a utility measuring endpoint, a communication endpoint, a utility endpoint, etc.) 108. The example utility measuring system 100 also includes a second bi-directional communication link 110 that communicatively couples the endpoint 108 to a server (e.g., a remote server, a data collection facility, etc.) 111. The example server 111 includes a head end (e.g., a server gateway, etc.) 112 and a remote server 114, both of which are coupled together via a connection 116, such as a file transfer protocol (FTP) in this example.

In this example, the first bi-directional communication link 106 is implemented as a wired cable and the second bi-directional communication link 110 is implemented as a radio frequency (RF) link. However, any appropriate communication link and/or server/network topographies may be utilized to implement (e.g., a wired or wireless implementation thereof) the communication connections/links 106, 110, 116 instead.

To characterize a condition (e.g., a baseline or current/operating condition) of the fluid delivery/utility system 101, the sensing module 102 of the illustrated example utilizes a sensor to record or measure (e.g., acoustically measure) multiple recordings (e.g., time-domain recordings) from a section or portion of the fluid delivery/utility system 101 to define a spectral average, for example. According to the illustrated example, the spectral average is generated based on converted spectral representations of the recordings.

In this particular example, the sensing module 102 is coupled to a pipe of the fluid delivery/utility system 101. According to the illustrated example, and as will be discussed in greater detail below in connection with FIGS. 3-9, the analysis module 104 performs averaging of known or baseline recordings to define a spectral average (e.g., a baseline spectral average) that may be used in comparisons with current recordings and/or current spectral averages to determine a leak condition of the fluid delivery/utility system 101, for example.

In some examples, the analysis module 104 packages or encodes the current recordings, spectral representations and/or spectral average(s) (e.g., for later transmission to the remote server 114) into a data packet. Additionally or alternatively, the analysis module 104 controls parameters of the sensing module 102 based on current recording measurements (e.g., a measured amplitude of a current recording) or averages. For example, the analysis module 104 may direct an increase or increase of a polling frequency and/or control a power mode of the sensing module 102 based on the measurements (e.g., an increased polling frequency based on a sudden increase in amplitude of the measurements).

To transmit the recordings, the spectral representations, the spectral averages and/or determined condition(s) to the example server 111 (e.g., to the server 111 for later analysis), the sensing module 102 transmits the aforementioned data packet to the endpoint 108 via the bi-directional communication link 106 and, in turn, the endpoint 108 transmits this data packet to the server 111 via the bi-directional communication link 110. In some examples, the head end 112 then forwards the data packet to the remote server 114. In particular, the data packet may be utilized and/or analyzed at the remote server 114, which may be located at a utility control center/facility, to convey a condition of an overall utility node/network and/or direct maintenance crews for repair work need, for example.

In some examples, the analysis module 104 is implemented on the endpoint 108 or the server 111. In some examples, operational functionality of and/or analysis that is at least partially performed by the analysis module 104 is distributed across the sensing module 102, the endpoint 108 and/or the server 111 (e.g., a distributed analysis/computation topography). Additionally or alternatively, in some examples, the endpoint 108 is integral with the sensing module 102. In some examples, the sensing module 102 includes circuitry to receive power from the endpoint 108 and/or other external device.

Figure 2:
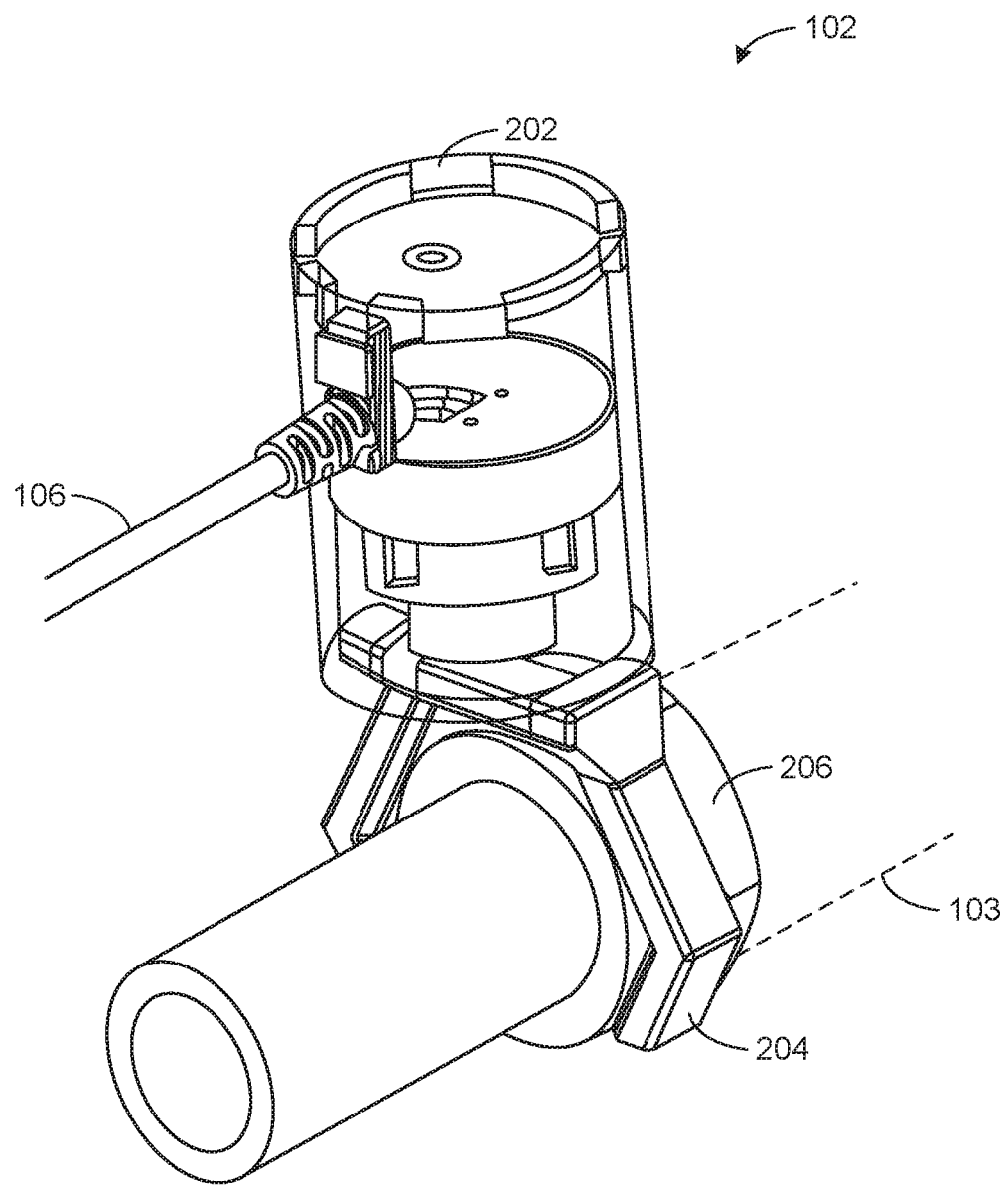
FIG. 2 is a transparent view illustrating an example sensing module of the example utility measuring system of FIG. 1.

FIG. 2 is a transparent view illustrating the example sensing module 102 of the example utility measuring system 100 of FIG. 1. The sensing module 102 of the illustrated example includes a housing 202, the bi-directional communication link 106, a coupler (e.g., a pipe clamp) 204 and a pipe fitting (e.g., a pipe clamp, a coupling section, etc.) 206 that is coupled to the pipe (e.g., a utility pipe, a water pipe, etc.) 103. According to the illustrated example, the coupler 204 aligns, secures and/or couples the sensing module 102 and/or the housing 202 to the pipe fitting 206 so that measurements or recordings related to the pipe 103 and/or the overall fluid delivery/utility system 101 may be performed or directed by the sensing module 102.

In operation, fluid generally flows along a longitudinal length of the pipe 103 and through the pipe fitting 206 in this example. In turn, the example sensing module 102 records and/or analyzes data (e.g., spectral data) related to this fluid flow to characterize an operating condition of the utility delivery/consumption system 101. As a result, data associated with this recording, which may be in the form of a data packet (e.g., a spectral data packet, a packet that includes compressed data), is transmitted to the endpoint 108 of FIG. 1. The communication link 106 of the illustrated example provides power to the sensing module 102 and may be used to provide commands to and/or control operation of the sensing module 102. In some examples, the sensing module 102 may be directed by the endpoint 108, the head end 112 and/or the remote server 114 to increase a polling/sensing rate and/or enter a low power mode, for example.

In some examples, the housing 202 is substantially environmentally sealed (e.g., hermetically sealed). Additionally or alternatively, the housing 202 may be sealed to the coupler 204 in some examples. In other examples, the sensing module 102 is directly coupled to the pipe 103 or is defined in the fitting 206.

Figure 3:
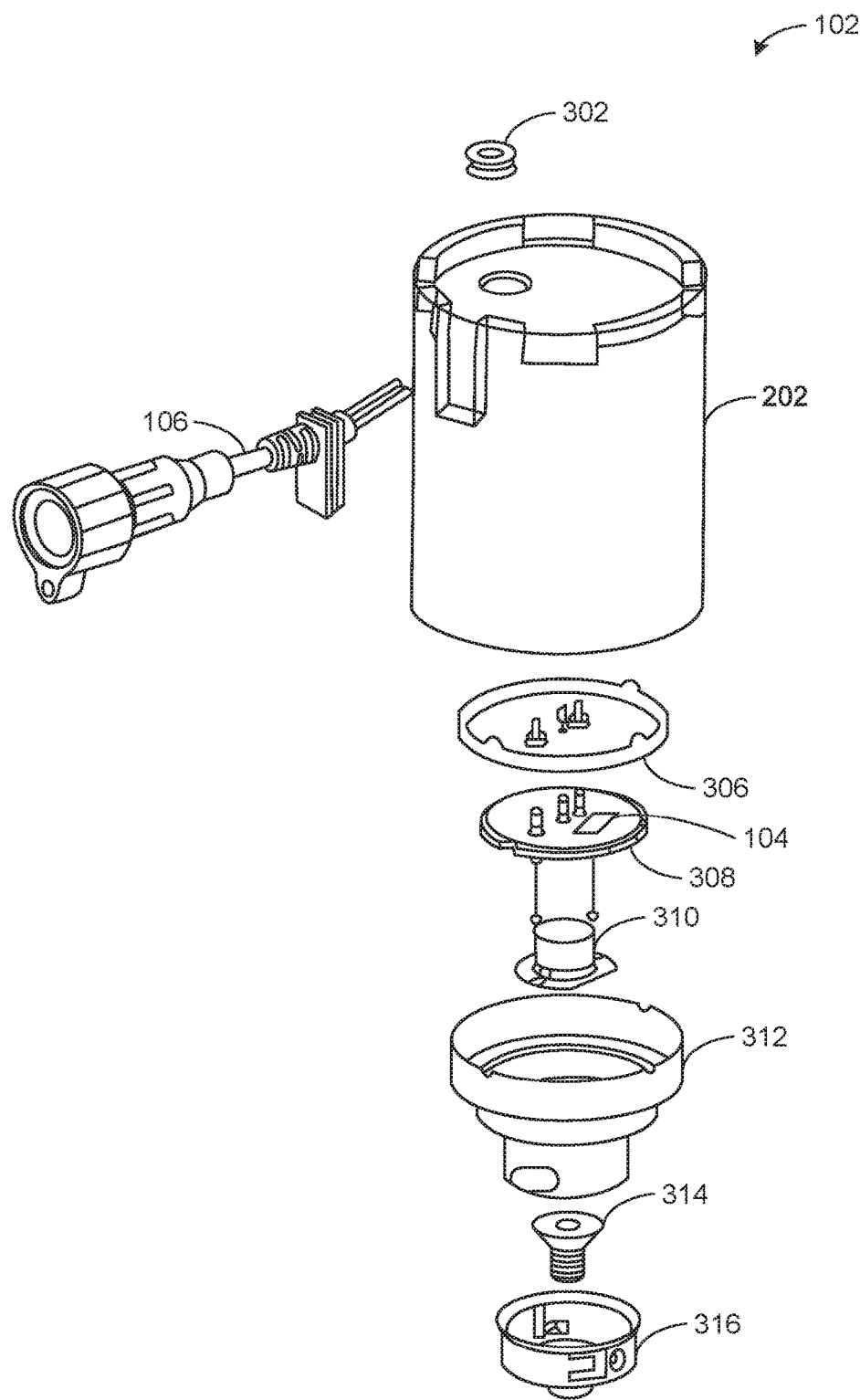
FIG. 3 is an exploded view of the example sensing module shown in FIGS. 1 and 2.

FIG. 3 is an exploded view of the example sensing module 102 shown in FIGS. 1 and 2. The sensing module 102 of the illustrated example includes a removal grommet 302, the housing 202, the communication link 106, a lid 306, a circuit board (e.g., a printed circuit board) 308 that includes the analysis module 104, a sensor 310, a housing portion 312, a mechanical coupler or fastener 314 and a mount assembly 316, which is to be coupled to the coupler 204 shown in FIG. 2 via the fastener 314 in this example.

According to the illustrated example, to measure or record recordings/data associated with fluid delivery operation, the sensor 310, which is implemented as an acoustic sensor in this example, is operatively coupled to the pipe fitting 206 and/or the pipe 103. In this example, the sensor 310 records and/or measures recordings corresponding to the fluid delivery/utility system 101. In this example, the sensor 310 records vibration signals (e.g., vibrations, vibration recordings, vibration waveforms, processed vibration signals, sound, etc.) to be used in characterizing a leak condition of the pipe 103 and/or the respective fluid delivery/utility system 101. In particular, the example sensor 310 may record at least one recording based on a pre-defined or designated time period. In some examples, the recording may be converted (e.g., transformed) to a spectral representation to characterize the vibrational and/or acoustic signal over a frequency domain (e.g., relating amplitude of the vibrational and/or acoustic signal to frequency). In particular, the recording may be converted from a time-domain sample to a frequency domain.

In this example, to characterize, analyze and/or determine a leak condition, circuitry of the circuit board 308, which includes the analysis module 104 shown in FIG. 1, receives a plurality of baseline recordings measured at the sensor 310. In turn, the circuit board 308 utilizes this plurality of baseline recordings to be converted to corresponding spectral representations for generating a baseline spectral average and/or baseline noise signature. Such a process is described in detail below in connection with FIG. 6. In this example, the baseline spectral average is transmitted to the remote server 114 as a first data packet.

In this example, the sensor 310 also measures current recordings subsequent to the generation of the baseline spectral average and, in turn, converts the current recordings to respective spectral representations that are used to generate a current spectral average, which is also generated using the process described below in connection with FIG. 6. In particular, the current spectral average may be generated and stored over a periodic basis (e.g., every day, every week, etc.). In this example, the current spectral average is transmitted to the remote server 114 as a second data packet. According to the illustrated example, the current spectral average is then compared to the baseline spectral average by the remote server 114 to determine the leak condition.

Additionally or alternatively, the current spectral average is compared to a known signature (e.g., a known leak signature), which may be characterized in the time domain or frequency domain. In particular, this known signature may correspond to an expected spectral signature based on a known parameter. For example, a square wave in the time domain may be representative a spinning disk of a utility water meter. In another example, a pronounced 60 or 120 Hertz (Hz) in the frequency domain may indicate electrical/power noise. Additionally or alternatively, the known signatures may take into account geometry (e.g., diameter, cross-sectional profile, length etc.) and/or material(s) (e.g., plastic, metal, etc.) of pipes. In some examples, the circuit board 308 stores the aforementioned known signature, which may be received and/or downloaded from the remote server 114. Additionally or alternatively, the baseline spectral average is subtracted from the current spectral average prior to making this comparison. In some examples, the current spectral average is compared to historical spectral averages and/or recordings.

In examples where the determination of the leak condition is performed solely at the circuit board 308, to transfer the determined leak condition so that appropriate actions may be taken (e.g., service related actions), the circuit board 308 transmits data associated with the determined leak condition to the end point 108 via the communication link 106. In some examples, the circuit board 308 encodes and/or compresses this data to be included in a data packet for transmission.

While the sensor 310 of the illustrated example is described as a vibrational sensor in this example, the sensor 310 may be implemented as any other appropriate sensor type such as a pressure sensor, a sound sensor and/or a temperature sensor, for example, may be used. In some examples, the sensor 310 includes an accelerometer, which may be implemented as piezo-electric accelerometer, a micro-electromechanical system (MEMS) device, a ceramic accelerometer, or any other appropriate type of accelerometer, etc. In some examples, the sensor 310 is integral with the circuit board 308.

Figure 4:
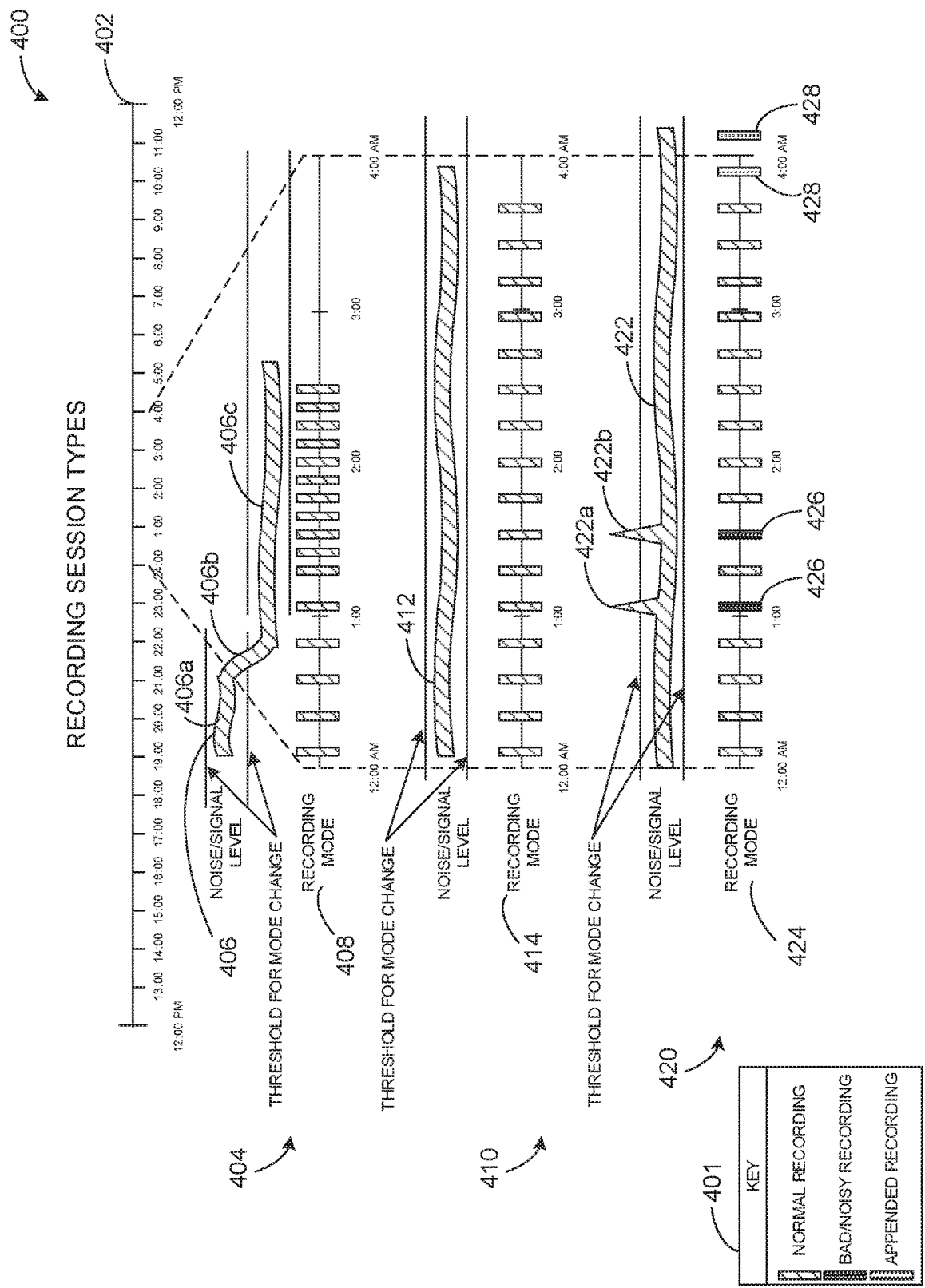
FIG. 4 is an example plot representing example signal acquisition and analysis in accordance with the teachings of this disclosure.

FIG. 4 is a plot 400 representing example signal acquisition and analysis in accordance with the teachings of this disclosure. In particular, adaptive sampling of obtaining recordings that is performed by the sensor 310 to enable the circuit board 308 to generate a spectral average (e.g., a spectral noise signature), which may be used to define a baseline spectral average or a current spectral average, over different recording session types is demonstrated. Further, the example plot 400 also illustrates example sensor initiation that may be implemented in the examples disclosed herein. In the view of FIG. 4, a legend 401 representing signal recording classifications and a time scale 402 representing a time of day are shown.

According to the illustrated example, a first example recording session 404 is shown over a portion of the time scale 402. A signal plot (e.g., a measured plot, a measured recording, a recorded section, etc.) 406 of recording measurements is characterized by its regions or portions 406a, 406b and 406c. In the region 406a, the signal plot 406 exhibits relatively flat behavior. As can be seen in the region 406b of FIG. 4, the signal plot 406 decreases and crosses a threshold (e.g., a set point) and/or threshold range, and generally levels out and/or flattens along the region 406c. Accordingly, a corresponding recording mode 408 shows an increase in polling of the sensor 310 (e.g., an increased data acquisition rate of the sensor 310) based on a transition from the region 406b to the region 406c, for example. In this particular example, an amplitude above a threshold level triggers a recording session to begin and subsequent movement across one or more thresholds causes a polling rate to vary.

A second example recording session 410 involves a signal plot 412 remaining within a threshold range and, in turn, a polling frequency shown in a corresponding recording mode 414 does not change, in contrast to the example recording session 404. In this example, approximately 10-20 recordings (e.g., sixteen recordings) are needed to develop the spectral average and/or noise profile. However, any appropriate number of samples may be used since the appropriate number of recordings can be dependent on application or use.

A third example recording session 420 shows a signal plot 422 having corresponding noisy regions 422a and 422b. In this example, a corresponding recording mode 424 indicates noisy recordings 426, both of which are discarded/rejected. Accordingly, to obtain a proper number of recordings in this example, the sensor 310 is directed to measure and/or append recordings 428 based on the deletion of the noisy recordings 426.

In some examples, a recording session is initiated based on a measured amplitude exceeding a threshold (e.g., an absolute peak amplitude in the time domain may be utilized). In some examples, when periods pertaining to relatively low amplitude measurements (e.g., quiet periods) are subsequently followed up with a relatively large amplitude signal, a recording session is initiated.

In some examples, if a recording session ends up noisy and/or faulty (e.g., the recordings 426), configuration data and/or operating parameters of the sensor 310 (shown in FIG. 3) may be adjusted by the circuit board 308 to increase a probability of less-noisy signals measured at the sensor 310, for example. In some examples, indication of a faulty recording session and/or incomplete recording data (e.g., a lower number of recordings than a requisite number, a disconnect, etc.), may trigger a bias flag to be transmitted (e.g., added or encoded to a data packet that is transmitted).

In some examples, if a recording session is successful, the associated data and/or recording session data is converted to and/or analyzed within the frequency domain to define at least one spectral representation. Additionally or alternatively, associated spectral energy is examined and may be weighted to an array of the following values: [−1 0 1], for example. In particular, for the spectral energy measurements with central tendencies (e.g., falling within expected statistical bounds), the corresponding spectral representation and/or recording is given a weighting value close to 0 (e.g., a value of 0). Accordingly, higher spectral energy recordings and/or corresponding spectral representations may be weighted with a positive value while, in contrast, lower spectral energy recordings and/or corresponding spectral representations may be weighted with a negative value.

In some examples, root-mean-square (rms) data associated with the recordings is analyzed and/or examined. In such examples, if the rms variance is low, a minimal change in signal amplitude may be determined. Additionally or alternatively, summing a combination of spectral weighting as well as rms variance may indicate a value indicating data fit quality (e.g., a "goodness" of fit).

In some examples, recording times and/or time period(s) of the day to record are selected based on a time of day, one or more previous recordings and/or one or more previously generated spectral representations. In such examples, the selected recording times (e.g., time of day) may be transmitted to an external device (e.g., so that the external device may trigger the leak detection sensor 310 and/or the sensing module 102 to turn on).

Any aspect described above with respect to any of the example recording sessions 404, 410 and 420 may be used in collecting recordings and/or developing spectral representations to generate spectral averages that pertain to a baseline (e.g., known condition) spectral average or a new/current spectral average (e.g., today's spectral average from 2 am to 4 am, etc.). In particular, the collected and/or sorted recordings may be processed using any combination of the techniques described above to generate the aforementioned averaged recordings.

In some examples, fault-indicating recordings indicating abnormal operation, improper installation and/or misplacement of the sensor 310 and/or the sensing module 102 trigger a warning and/or flag to indicate that the recordings obtained are faulty and/or may result in generation of faulty spectral representations and/or averages. Additionally or alternatively, these fault indicating recordings may trigger a reset of the sensor 310 and/or the sensing module 102.

Figure 5:
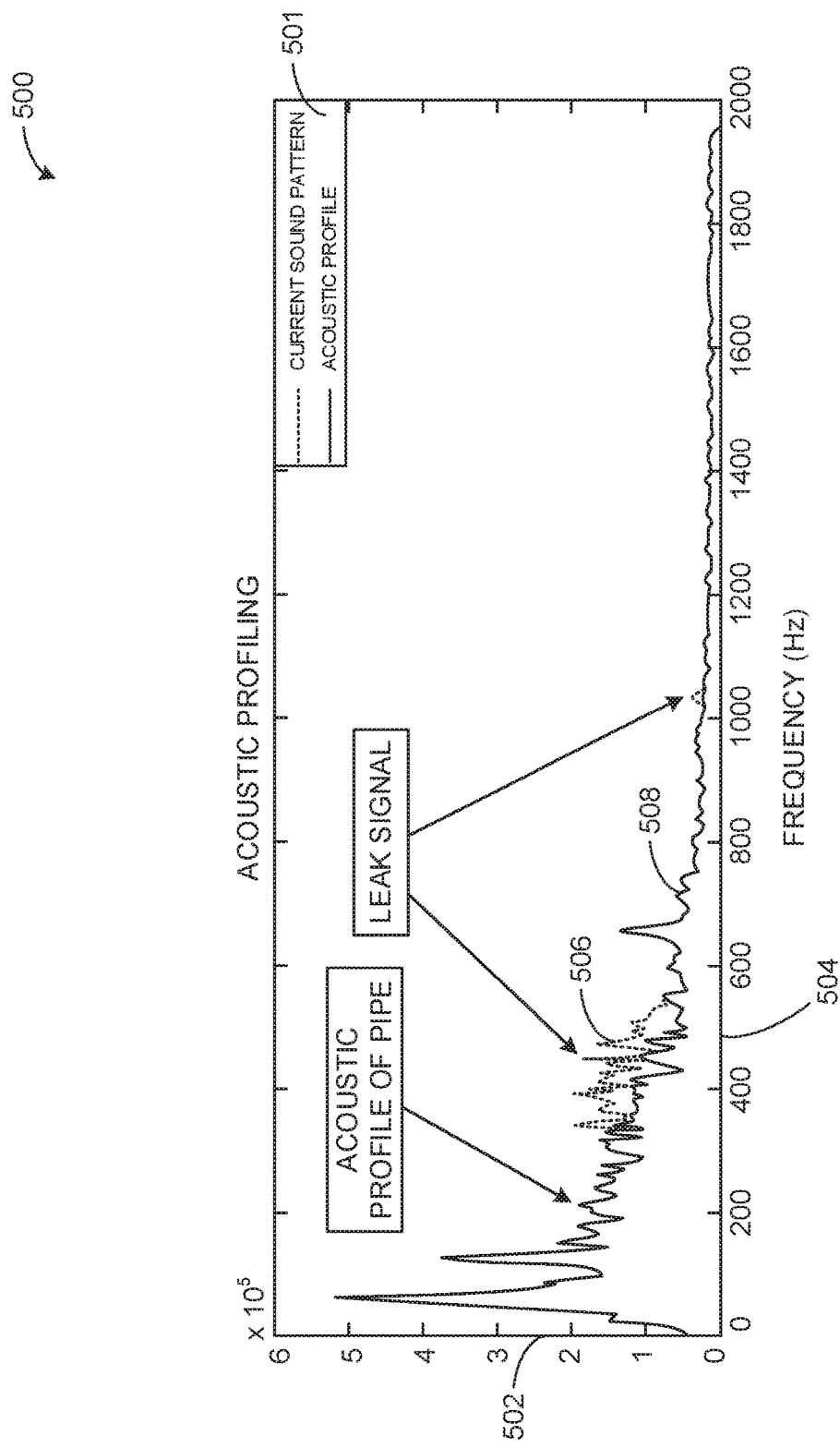
FIG. 5 is a graph representing a signal recording comparison that may be implemented in the examples disclosed herein.

FIG. 5 is a graph 500 representing a signal recording comparison that may be implemented in the examples disclosed herein. In particular, this comparison may be performed by the remote server 114 or the circuit board 308. According to the illustrated example, the graph 500 shows an example comparison of a baseline spectral average to a current spectral average (e.g., recordings averaged within the last day). According to the illustrated example of FIG. 5, the graph 500 includes a legend 501, a horizontal axis 502, which indicates an acoustic amplitude, and a horizontal axis 504 that indicates an acoustic frequency in hertz (Hz). In this example, the current spectral average and the baseline spectral average are characterized, compared and/or analyzed in the frequency domain.

In the example graph 500 of FIG. 5, a current spectral average plot 506 is shown in relation to an averaged baseline spectral plot (e.g., an acoustic profile corresponding to the pipe 103 of FIGS. 1 and 2) 508. In this example, a difference between the current spectral average plot 506 and averaged baseline spectral plot 508 is used to determine a leak condition of a corresponding fluid delivery system. In other words, a significant difference, variance and/or a degree to which the current spectral average plot 506 and the averaged baseline spectral plot 508 differ may indicate an overall condition of the fluid delivery system. In this example, the averaged baseline spectral plot 508 is subtracted (e.g., via a spectral subtraction) from the current spectral average plot 506 to determine this difference.

In some examples, the difference between the current spectral average plot 506 and averaged baseline spectral plot 508 is determined and/or calculated by taking an integral of a difference between the current spectral average plot 506 and averaged baseline spectral plot 508 (e.g., an integral average of the differences). In other words, sum areas of the current spectral average plot 506 and averaged baseline spectral plot 508 may be subtracted from one another to determine the difference. Additionally or alternatively, overall shapes of waveforms corresponding to the current spectral average plot 506 and the averaged baseline spectral plot 508 are compared to one another to determine this difference.

In some examples, the difference between the current spectral average plot 506 and the averaged baseline spectral plot 508 is determined by quantifying a maximum numerical difference in amplitude. In particular, the maximum difference at a certain frequency between the current spectral average plot 506 and the averaged baseline spectral plot 508 may be selected to determine a leak condition, for example.

Additionally or alternatively, at least one peak and/or characteristic shape of the current spectral average plot 506 is tracked as it shifts over time (e.g., while generally retaining aspects of its characteristic waveform) and this shift is taken into account when comparing the current spectral average plot 506 to the averaged baseline spectral plot 508. In such examples, spectral tracking can be effective at tracking peak and/or waveform shifts based on edges of the current spectral average plot 506 that are clearly defined in the frequency domain.

In some examples, time-domain recordings corresponding to the averaged baseline spectral plot 508 and/or the current spectral average plot 506 are processed/transformed with a fast Fourier transform (FFT) for later characterization and/or comparison.

Figure 6:
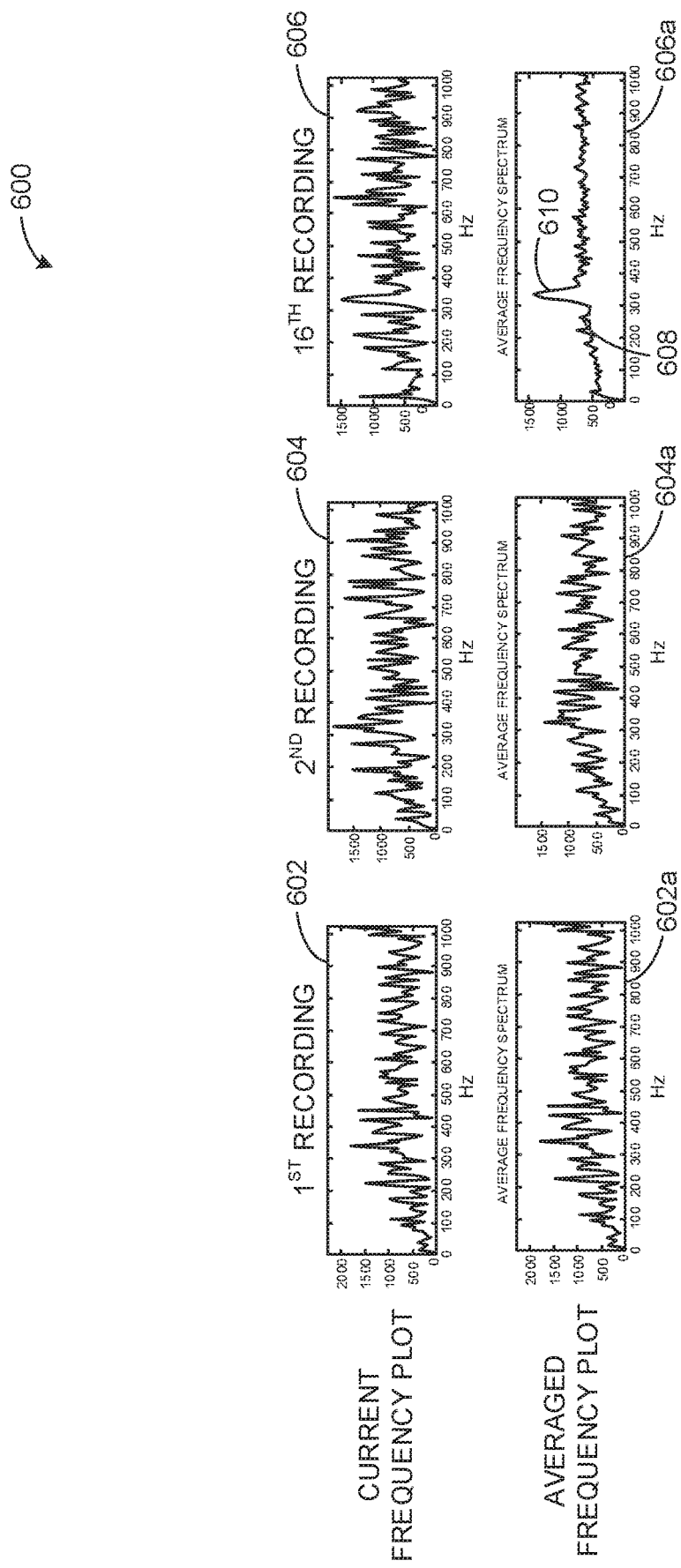
FIG. 6 illustrates an example averaging process that may be implemented in the examples disclosed herein.

FIG. 6 illustrates an example result of an averaging process that may be implemented in the examples disclosed herein. In particular, the example of FIG. 6 demonstrates how multiple recordings that are converted to spectral representations can then be averaged to generate a spectral average, which may correspond to either a baseline spectral average or a current spectral average. In other examples, the recordings and/or spectral representations may be normalized (e.g., amplitudes represented as ratios of one) instead of averaged.

As can be seen in FIG. 6, spectral representations 602, 604 and 606 are shown, which correspond to first, second and sixteenth recordings, respectively, in this example. An averaged frequency plot 602a, which corresponds to the first spectral representation 602, is similar and/or identical to the averaged frequency plot 602a because there have not yet been any other samples to average with.

A second averaged frequency plot 604a corresponds to an average including the spectral representation 602 and the spectral representation 604. However, in this example, not enough measurements have been taken to generate a fully-defined baseline spectral noise average.

A third averaged frequency plot 606a corresponds to sixteen recordings, which include the spectral representations 602, 604 and 606, as well as additional spectral representations not shown. According to the illustrated example, the third averaged frequency plot 606a exhibits a relative flat region 608 and a well-defined peak 610 (between 300 and 400 Hz) that is disposed between portions of the flat region 608. As a result, the corresponding spectral average is well-defined (e.g., fully-defined).

Accordingly, the third averaged frequency plot 606a may be used as an averaged baseline spectral average to be compared to a current spectral average to determine a leak condition. Alternatively, the third average plot 606a may define the current spectral average that is compared to another baseline spectral average. In this example, taking a significant and/or requisite amount of recordings enables noise (e.g., environmental noise, random noise, etc.) to be effectively canceled out and/or smoothed out. In other words, the randomness of multiple recordings and/or their associated spectral representations effectively removes random noise from inherent or characteristic system noise, thereby enabling very accurate baseline or known scenario characterization. While sixteen recordings/signatures are described in this example, any appropriate number of recordings may be used based on accuracy needs and/or inherent characteristics of a respective fluid delivery system.

In some examples, different recordings and/or associated spectral representations are weighted differently. In particular, a recording, which may be associated with a known baseline time period, historical and/or older in time, may have a greater weighting factor than later added recordings, for example. In some examples, similar recordings and/or associated spectral representations are grouped together (e.g., assigned a particular number based on similar amplitudes and/or waveforms), thereby defining grouped recordings or representations. Additionally or alternatively, these grouped recordings or spectral representations are designated a number or label (e.g., 127) that can be incremented based on increasing amplitudes (e.g., 127+1). In these examples, these grouped recordings or spectral representations may be averaged or normalized together to define a grouped spectral average.

Figure 7:
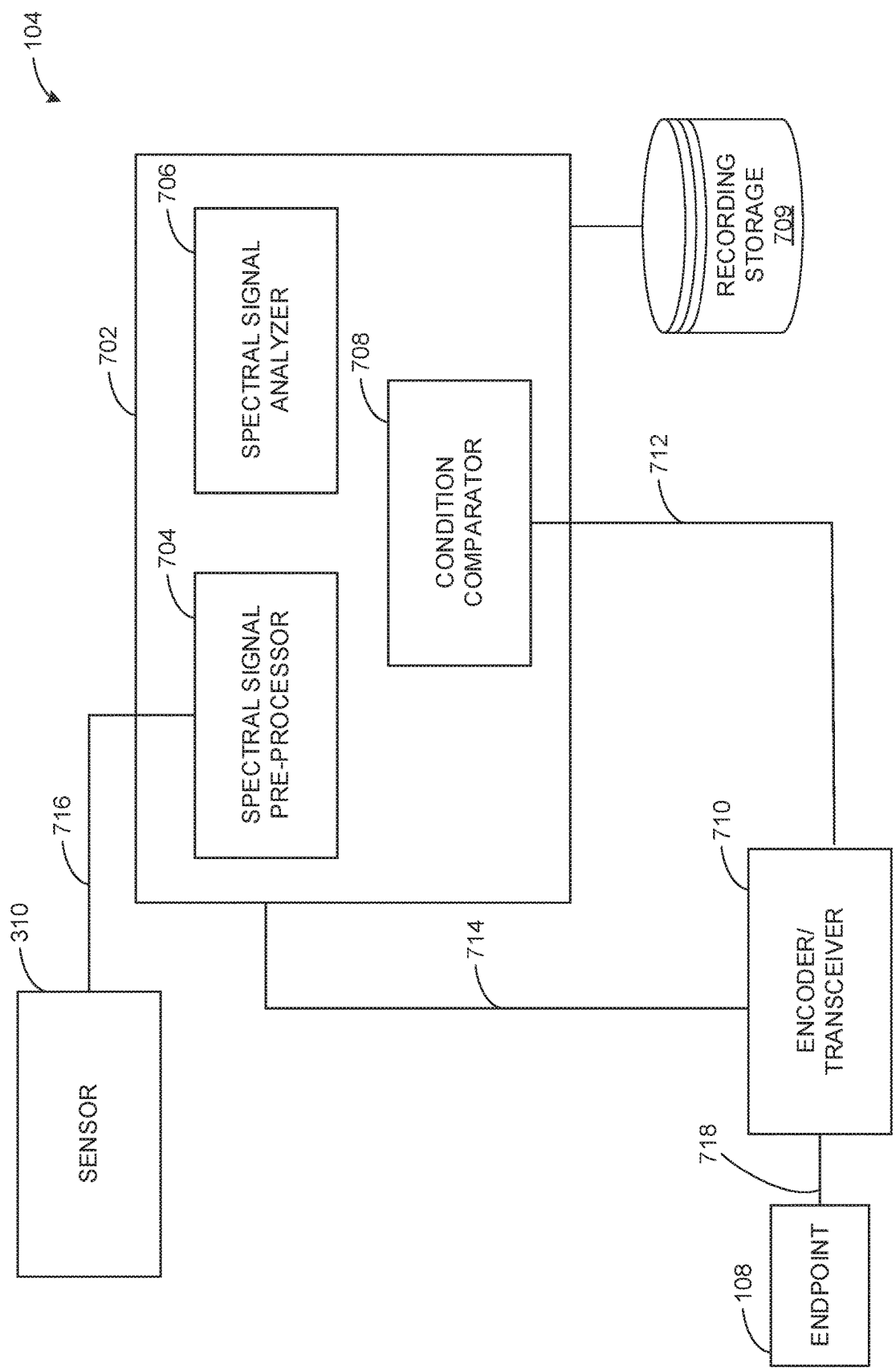
FIG. 7 is a schematic overview of an analysis module of FIG. 1 that may be used to implement the examples disclosed herein.

FIG. 7 is a schematic overview of the example analysis module 104 of FIG. 1 that may be used to implement the examples disclosed herein. The example analysis module 104 of the illustrated example includes a spectral signal calculator 702, which includes a spectral signal pre-processor 704, and a spectral signal analyzer 706 and a condition comparator 708.

The example analysis module 104 also includes a recording or signature storage 709 and an encoder/transmitter 710 that is communicatively coupled to the spectral signal calculator 702 via a communication line 714. Further, the example encoder/transceiver 710 is communicatively coupled to the condition comparator 708 via a communication line 712. Also, the sensor 310 of FIG. 3 is shown communicatively coupled to the spectral signal pre-processor 704 via a communication line 716. Further, the encoder/transceiver 710 is communicatively coupled to the endpoint 108 via a communication line 718.

To obtain a requisite amount of recordings (e.g., time-domain recordings) to be converted to associated spectral representations to sufficiently define or generate a spectral average, the sensor 310 of the illustrated example provides a plurality of recordings to the spectral signal pre-processor 704 so that each recording of the plurality of recordings is converted to a respective spectral representation. In turn, the spectral signal pre-processor 704 determines whether the spectral representations and/or the recordings meet noise and/or waveform requirements and collects a requisite number (e.g., 10-20, 100, 1000, etc.) of the recordings from the sensor 310 that are needed to generate a well-defined spectral average (e.g., a current spectral average, a baseline spectral average). Additionally or alternatively, the spectral signal pre-processor 704 directs and/or controls operating parameters of the sensor 310. For example, the spectral signal pre-processor 704 may control a polling frequency and/or power consumption mode (e.g., a low power mode, etc.) of the sensor 310 based on at least one recording and/or an associated spectral representation. Accordingly, the spectral signal pre-processor 704 acts as power controller of the sensor 310 in these examples. Additionally or alternatively, the sensor 310 is to exit an off power state based upon a supply of power from an external device (e.g., the endpoint 108) and to return to the off power state after a data packet is transmitted, for example.

To generate the spectral average/signature, the example spectral signal analyzer 706 averages multiple spectral representations by performing averaging techniques shown and described in connection with the example of FIG. 6. In this example, the spectral signal analyzer 706 receives multiple spectral representations of recordings that have been sorted and/or pre-processed by the example spectral signal pre-processor 704 to generate the spectral average. Additionally or alternatively, these pre-processed recordings, the respective spectral representations and/or the generated spectral average is stored in the recording storage 709 and retrieved therefrom (e.g., retrieved to be packaged with a later measured current spectral average).

To determine a leak condition and/or operational status, the condition comparator 708 of the illustrated example compares the current spectral average to the baseline spectral average. In this example, this determination is based on a degree to which the current spectral average varies from the baseline spectral average. Once this leak condition has been determined, the condition comparator 708 transmits the determined leak condition and/or a packet containing the current spectral average to the encoder/transceiver 710 which, in turn, forwards this data to the endpoint 108 of FIG. 1. In some examples, the baseline spectral average is updated to be the current spectral average. For example, similar consecutive current spectral averages and/or significant differential changes in current spectral averages may cause this update to occur.

In some examples, the current spectral average is compared to a historical recording and/or spectral average to determine the leak condition. Additionally or alternatively, a previously saved recording is retrieved from the recording storage 709 and/or spectral data packets are retrieved or transmitted for leak condition determinations.

In some examples, overall energy of a spectral average may be taken into account for leak condition determination. In such examples, seasonal variations, noise variations, etc. may be taken into account.

Additionally or alternatively, in some examples, known signature(s) are stored in the recording storage 709 and may be retrieved and transmitted (e.g., transmitted upon request, etc.). In such examples, the condition comparator 708 compares the known signature to the current recording, spectral representation and/or spectral average. The known signature may be selected from the storage 709 based on one or more operating parameters, which may include, but is not limited to, pipe diameter, pipe structure, pipe material(s), overall utility delivery design parameters, etc.

While an example manner of implementing the example analysis module 104 of FIGS. 1 and 7 is illustrated in FIG. 7, one or more of the elements, processes and/or devices illustrated in FIG. 7 may be combined, divided, re-arranged, omitted, eliminated and/or implemented in any other way. Further, the example spectral signal pre-processor 704, the example spectral signal analyzer 706, the example condition comparator 708, the example encoder/transmitter 710 and/or, more generally, the example analysis module 104 of FIGS. 1 and 7 may be implemented by hardware, software, firmware and/or any combination of hardware, software and/or firmware. Thus, for example, any of the example spectral signal pre-processor 704, the example spectral signal analyzer 706, the example condition comparator 708, encoder/transmitter 710 and/or, more generally, the example analysis module 104 could be implemented by one or more analog or digital circuit(s), logic circuits, programmable processor(s), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example, spectral signal pre-processor 704, the example spectral signal analyzer 706, the example condition comparator 708, and/or the example encoder/transmitter 710 is/are hereby expressly defined to include a tangible computer readable storage device or storage disk such as a memory, a digital versatile disk (DVD), a compact disk (CD), a Blu-ray disk, etc. storing the software and/or firmware. Further still, the example analysis module 104 of FIGS. 1 and 7 may include one or more elements, processes and/or devices in addition to, or instead of, those illustrated in FIG. 7, and/or may include more than one of any or all of the illustrated elements, processes and devices.

Figure 8:
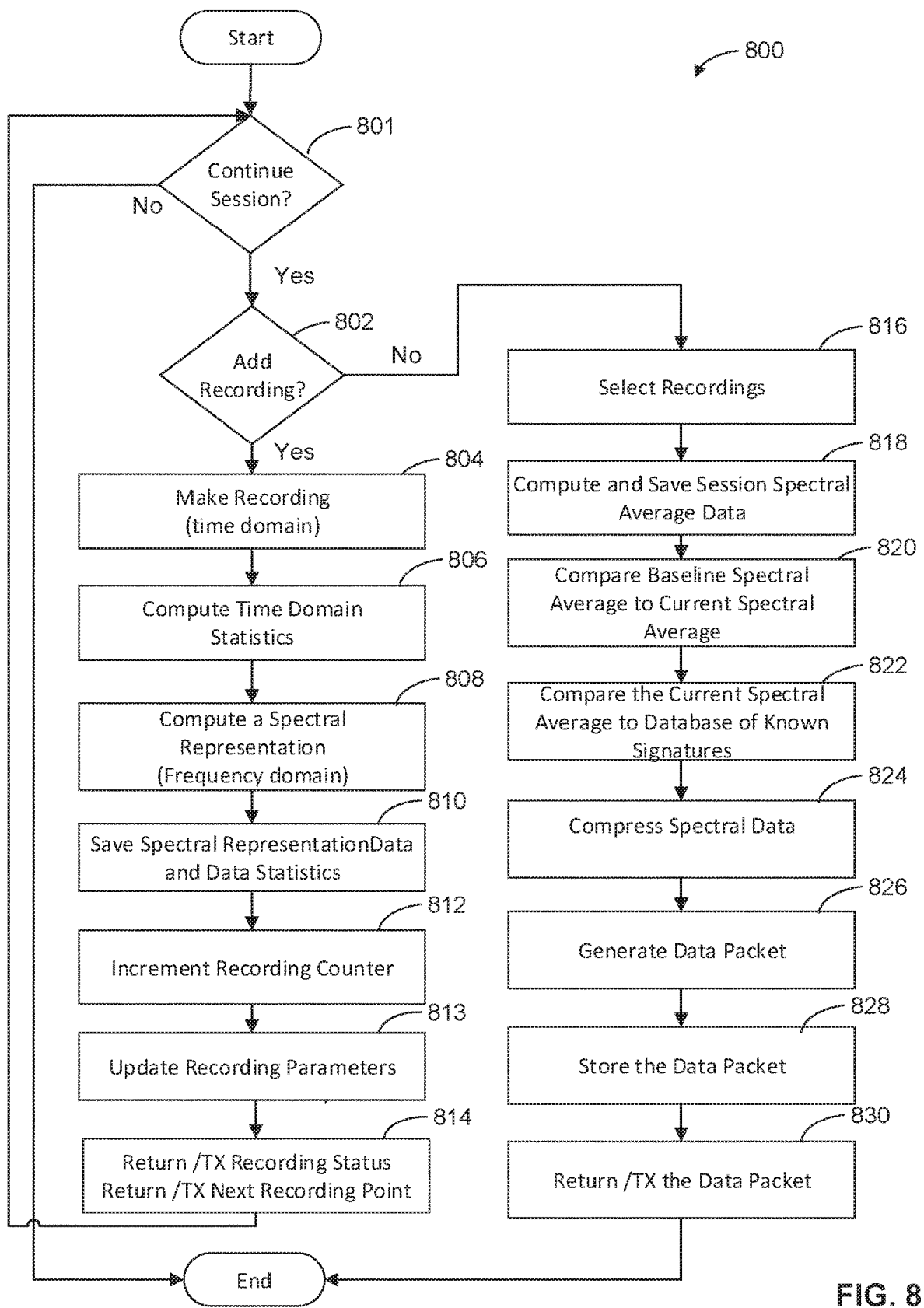
FIG. 8 is a flowchart representative of machine readable instructions that may be executed by the example analysis module of FIGS. 1 and 7.

A flowchart representative of example machine readable instructions for implementing the analysis module 104 of FIG. 7 is shown in FIG. 8. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example analysis module 104 may alternatively be used. For example, the order of execution of the blocks may be changed, and/or some of the blocks described may be changed, eliminated, or combined.

As mentioned above, the example processes of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 8 begins as the leak detection sensor 301 that has been coupled to an installation (e.g., a previously installed installation) that is currently being operated. In this example, the installation is being used as a node in a utility network and/or system to provide fluid (e.g., water or gas) to utility customers and a baseline spectral average has already been calculated and uploaded to the remote server 114 by the analysis module 104.

In this example, the spectral pre-processor 704 determines whether a session (e.g., a recording session, a characterization session, etc.) should be active (block 801). If the session is to be active and/or continue (block 801), control of the process proceeds to block 802. Otherwise, the process ends (e.g., the recording session is not continued or initiated).

According to the illustrated example, it is then determined whether recordings are to be added and/or obtained (block 802). In particular, the spectral signal pre-processor 704 and/or the spectral signal analyzer 706 may determine whether the recordings are to be obtained. This determination may be based on whether a new spectral average is needed (e.g., whether a spectral average of the today's recordings is desired) or whether a new baseline spectral average should or needs to be defined. If additional recordings are to be added (block 802), control of the process proceeds to block 804. Otherwise, the process proceeds to block 816.

If at least one additional recording is to be added/obtained (block 802), a recording is made (block 804). In this example, the sensor 301 records a time domain signal/recording and/or characteristics in the time domain.

According to the illustrated example, time domain statistics of the recording are computed by the spectral signal pre-processor 704, for example (block 806). For example, numerous quantitative attributes of the recording such as peaks and/or signal patterns, for example, in the time domain may be recorded and/or characterized. In some examples, data associated with these time-domain characteristics is stored in the recording storage 709 for later transmission (e.g., encoded in a packet along with the spectral average data).

A spectral representation of the time-domain recording is computed/calculated by the example spectral signal analyzer 706 and/or the spectral signal pre-processor 704 (block 808). In other words, the time domain signal recording is converted into a frequency domain recording via a transformation. In this example, this conversion occurs via an FFT analysis of the time domain signal, thereby defining a spectral representation. In some examples, a power spectral density calculation is used. In some examples, wavelet filtering is performed.

Next, the spectral representation and/or data associated with the spectral representation is saved (block 810). In this example, the spectral representation is saved onto the recording storage 709.

In some examples, a recording counter (e.g., a counter to record a number of recordings) is incremented (block 812). In such examples, the counter is used to determine whether a minimum number of recordings have been obtained (e.g., 16 recordings, 50 recordings, etc.).

According to the illustrated example, recording parameters of the sensor 310 may be updated and/or varied (block 813). In particular, the spectral signal pre-processor 704 and/or the spectral signal analyzer 706 of the illustrated example may vary a polling frequency and/or power draw mode of the sensor 310 based on at least one incoming current recording and/or its associated spectral representation.

In some examples, this polling frequency may be varied based on a pipe configuration (e.g., diameter, material, coupling implementation), type of environment (e.g., residential, valve, industrial, commercial, etc.), or any appropriate environment. Additionally or alternatively, sensor 310 is directed to perform measurements at a defined time period (e.g., a few minutes, a few hours, a few days, a few months, etc.) after certain events and/or daily use patterns.

In some examples, a return/transmit recording status is transmitted by the encoder/transceiver 710, for example (block 814) and the process returns to block 801.

In some examples, recordings and/or associated spectral representations are selected and/or sorted (block 816). In particular, the spectral signal pre-processor 704 of the illustrated example may remove noisy spectral representations and/or append newer spectral representations. Additionally or alternatively, spectral representations are grouped by similarity (e.g., a similarity in peak amplitude and/or waveform shape, etc.).

According to the illustrated example, session/current spectral data and/or average is computed and saved (block 818). In particular, a spectral average of the converted spectral representations is generated and/or computed.

In some examples, the baseline spectral average is compared to the current session spectral average to determine a leak condition (block 820). In particular, the condition comparator 708 and/or the remote server 114 may perform this comparison. In this example, the baseline spectral average is subtracted from the current session spectral average. In other examples, an integral average between the current spectral average and the baseline spectral average may be used. In some examples, this comparison is at least partially based on a known spectral signature that is stored in the signature storage 709. Additionally or alternatively, differences (e.g., numerical differences) in amplitude peaks at respective frequencies and/or frequency ranges are compared.

In some examples, the spectral average is compared to a known signature from a database (block 822). This comparison may be performed to determine a leak condition. In particular, the database may be stored on the recording storage 709 and/or the remote server 114.

In some examples, the collected spectral average data is compressed (block 824). In such examples, the spectral signal analyzer 706 and/or the spectral signal pre-processor 704 may perform the compression. For example, an A-law compression algorithm may be used. Additionally or alternatively, the collected spectral average data is grouped with other recordings and/or categorized into a known group of recordings/spectral representation to save disk storage space. In some examples, the compression may be performed to reduce necessary transmissions to the endpoint 108, thereby saving power and/or battery use.

According to the illustrated example, a data packet is encoded, computed and/or generated (block 826). In this example, the encoder/transceiver 710 packages the current spectral average for later transmission. In particular, the current session spectral average is encoded into a data packet. Further, other attribute information and/or characteristics such as time-domain characteristics may be encoded into the data packet. In some examples, temperature data (e.g., a time-temperature history) is also encoded into the data packet for additional analysis at the remote server 114. In some examples, a bias flag is also added to the data packet when there are a number of recordings or spectral representations below a threshold number.

In some examples, the recording storage 709 stores the data packet (block 828). For example, the data packet may be stored for later transmission and/or to be combined with other data later and/or for later transmission when the leak detection sensor is turned on.

According to the illustrated example, the data packet is transmitted (block 830) and the process ends. In particular, the example encoder/transceiver 710 transmits the aforementioned data packet to the remote server 114 via the endpoint 108.

Figure 9:
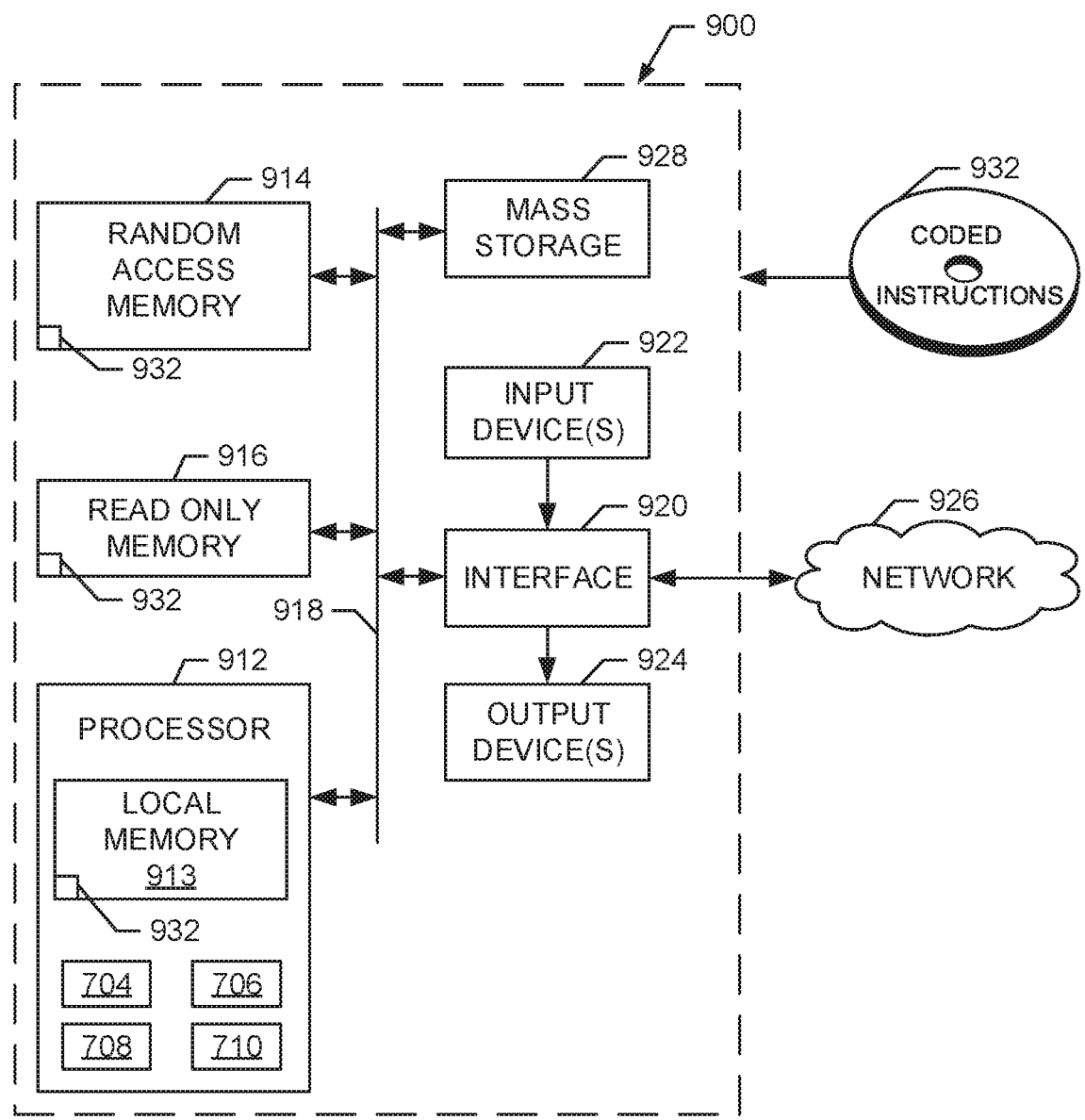
FIG. 9 is a processor platform that may be used to execute the example instructions of FIG. 8 to implement the example analysis module of FIGS. 1 and 7.

FIG. 9 is a block diagram of an example processor platform 900 capable of executing the instructions of FIG. 8 to implement the analysis module 104 of FIGS. 1 and 7. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The example processor also includes the example spectral signal pre-processor 704, the example spectral signal analyzer 706, condition comparator 708 and the encoder/transceiver 710. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 8 may be stored in the mass storage device 928, in the volatile memory 914, in the non-volatile memory 916, and/or on a removable tangible computer readable storage medium such as a CD or DVD.

Example Techniques and Use Cases

An example apparatus includes a leak detection sensor to record a plurality of recordings and a memory. The example apparatus also includes a processor to convert one or more of the plurality of recordings to a corresponding one or more spectral representations, calculate a spectral average based, at least in part, on the one or more spectral representations, store the spectral average to the memory, and generate a data packet based, at least in part, on the spectral average. The example apparatus also includes a transceiver to transmit the data packet to another device.

In some examples, the other device is a remote server or an endpoint coupled to a utility meter. In some examples, the endpoint or remote server is to compare information in the data packet to a baseline spectral average to determine a leak condition. In some examples, the processor is to compare the spectral average to a previously stored baseline spectral average to determine a leak condition.

In some examples, the comparison includes subtracting the previously stored baseline spectral average from the spectral average. In some examples, the processor is to reject one or more of the plurality of recordings or the one or more spectral representations prior to calculating the spectral average. In some examples, the processor is to direct the leak detection sensor to record additional recordings based, at least in part, on the rejection of the one or more of the plurality of recordings.

In some examples, the processor is to update a previously stored baseline spectral average based, at least in part, on the spectral average. In some examples, the example apparatus also includes a battery operatively coupled to the processor and the leak detection sensor. In some examples, the example apparatus also includes circuitry to receive power from an external device.

In some examples, the processor is to select one or more times to record the plurality of recordings based, at least in part, on one or more of a time of day, one or more previous recordings, and one or more previous spectral representations. In some examples, the processor is to transmit the selected one or more times to record the plurality of recordings to an external device.

In some examples, the leak detection sensor includes an accelerometer. In some examples, the transceiver is to receive a known signature, where the processor is to make a comparison based at least in part on the spectral average and the known signature, and the processor is to determine a leak condition based, at least in part, on the comparison. In some examples, a previously stored baseline spectral average is subtracted from the spectral average to make the comparison.

In some examples, the processor is to exit an off power state based upon a supply of power from an external device and to return to the off power state after transceiver transmits the packet. In some examples, the processor is to encode a bias flag into the data packet based, at least in part, on a number of recordings of the plurality of recordings being less than a threshold number.

In some examples, the memory includes non-volatile memory. In some examples, a fluid utility measuring device includes the example apparatus.

From the foregoing, it will be appreciated that the above disclosed methods, apparatus and articles of manufacture provide an effective and power-efficient manner of accurately determining a leak condition by generating a spectral average based on organizing and/or analyzing multiple recordings (e.g., multiple baseline recordings). In particular, the generated spectral averages that are not affected by ambient and/or inherent noise characteristics of corresponding systems (e.g., utility systems) and may be compared to a current recording to determine the leak condition. The examples disclosed herein also enable adaptive data sampling, which can reduce power consumption, especially in battery-run devices such as some remote sensors (e.g., remote acoustic leak detection sensors) to obtain recordings.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are shown in relation to utility metering systems, any of the examples disclosed herein, including the example processing and/or analysis techniques, may be used in any appropriate application(s).

What is claimed is:

1. An apparatus comprising:
   a sensor to record a plurality of recordings;
   a memory;
   a processor to:
      convert at least two recordings of the plurality of recordings to corresponding spectral representations, wherein the at least two recordings are separated by a time gap,
      calculate a spectral average based, at least in part, on the spectral representations,
      store the spectral average to the memory, and
      generate a data packet based, at least in part, on the spectral average; and
   a transceiver to transmit the data packet to another device to compare the spectral average to a baseline spectral average to determine a system condition.

2. The apparatus as defined in claim 1, wherein the system condition is a condition related to a utility system and the another device is a remote server or an endpoint coupled to a utility meter of the utility system.

3. The apparatus as defined in claim 1, wherein the system condition corresponds to a condition of a pipe of a fluid delivery system.

4. The apparatus as defined in claim 1, wherein the processor is to select one or more times to record the plurality of recordings based, at least in part, on one or more of a time of day, one or more previous recordings, and one or more previous spectral representations.

5. The apparatus as defined in claim 4, wherein the processor is to transmit the selected one or more times to record the plurality of recordings to an external device.

6. The apparatus as defined in claim 1, wherein the sensor includes an accelerometer.

7. The apparatus as defined in claim 1, wherein the sensor is a vibrational sensor, an acoustic sensor, or a sound sensor.

8. The apparatus as defined in claim 1, wherein the sensor is a pressure sensor or a temperature sensor.

9. The apparatus as defined in claim 1, wherein the processor is to exit an off power state based upon a supply of power from an external device and to return to the off power state after the transceiver transmits the data packet.

10. A method comprising:
    recording, at a sensor, a plurality of recordings;
    converting, at a processor, at least two recordings of the plurality of recordings to corresponding spectral representations, wherein the at least two recordings are separated by a time gap;
    calculating, at the processor, a spectral average based, at least in part, on the spectral representations;
    generating, at the processor, a data packet based, at least in part, on the spectral average; and
    transmitting the data packet to another device to compare the spectral average to a baseline spectral average to determine a system condition.

11. The method as defined in claim 10, wherein comparing the spectral average to the baseline spectral average includes subtracting the baseline spectral average from the spectral average.

12. The method as defined in claim 10, further including rejecting one or more of the plurality of recordings prior to calculating the spectral average.

13. The method as defined in claim 12, wherein the rejecting the one or more of the plurality of recordings includes rejecting the one or more of the plurality of recordings based on a corresponding noise level.

14. The method as defined in claim 12, further including directing the sensor to record additional recordings based, at least in part, on the rejection of the one or more of the plurality of recordings.

15. The method as defined in claim 10, further including updating the baseline spectral average based, at least in part, on the spectral average.

16. The method as defined in claim 10, further including selecting one or more times to record the plurality of recordings based, at least in part, on one or more of a time of day, one or more previous recordings, and one or more previous spectral representations.

17. The method as defined in claim 16, further including transmitting the selected one or more times to record the plurality of recordings to an external device.

18. The method as defined in claim 10, further including encoding a bias flag into the data packet based, at least in part, on a number of recordings of the plurality of recordings being less than a threshold number.

19. The method as defined in claim 10, further including:
   determining a spectral energy of at least one spectral representation of the spectral representations; and
   applying a weighting factor to the at least one spectral representation based on the spectral energy, wherein the spectral average is calculated based, at least in part, on the weighting factor.

20. The method as defined in claim 10, wherein the system condition is a condition related to a utility system and the another device is a remote server or an endpoint coupled to a utility meter of the utility system.

21. The method as defined in claim 10, wherein the system condition corresponds to a condition of a pipe of a fluid delivery system.

22. A non-transitory tangible machine readable medium comprising instructions, which when executed, cause a processor to at least:
   convert at least two recordings of a plurality of recordings to corresponding spectral representations, wherein the at least two recordings are separated by a time gap;
   calculate a spectral average based, at least in part, on the spectral representations;
   generate a data packet based, at least in part, on the spectral average, and
   cause a transceiver to transmit the data packet to another device to compare the spectral average to a baseline spectral average to determine a system condition.

23. The non-transitory machine readable medium as defined in claim 22, wherein the instructions cause the processor to reject one or more of the plurality of recordings prior to calculating the spectral average.

24. The non-transitory machine readable medium as defined in claim 22, wherein the instructions cause the processor to update the baseline spectral average based, at least in part, on the spectral average.

25. The non-transitory machine readable medium as defined in claim 22, wherein the instructions cause the processor to select one or more times to record the plurality of recordings based, at least in part, on one or more of a time of day, one or more previous recordings, and one or more previous spectral representations.

26. The non-transitory machine readable medium as defined in claim 22, wherein the instructions cause the processor to encode a bias flag into the data packet based, at least in part, on a number of recordings of the plurality of recordings being less than a threshold number.

27. The non-transitory machine readable medium as defined in claim 22, wherein the instructions cause the processor to:
   determine a spectral energy of at least one spectral representation of the spectral representations; and
   apply a weighting factor to the at least one spectral representation based on the spectral energy, wherein the spectral average is calculated based, at least in part, on the weighting factor.

28. The non-transitory machine readable medium as defined in claim 22, wherein the system condition is a condition related to a utility system and the another device is a remote server or an endpoint coupled to a utility meter of the utility system.

29. The non-transitory machine readable medium as defined in claim 22, wherein the system condition corresponds to a condition of a pipe of a fluid delivery system.

* * * * *